US010261732B2

(12) United States Patent
Oka et al.

(10) Patent No.: US 10,261,732 B2
(45) Date of Patent: Apr. 16, 2019

(54) IMAGE FORMING APPARATUS HAVING DOUBLE-SIDED PRINTING AND CONTROL METHOD OF THE SAME

(71) Applicant: CANON KABUSHIKI KAISHA, Tokyo (JP)

(72) Inventors: Yushi Oka, Abiko (JP); Masato Furukawa, Nagareyama (JP); Kaoru Hamada, Nagareyama (JP); Seiji Shibaki, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/806,746

(22) Filed: Nov. 8, 2017

(65) Prior Publication Data

US 2018/0150267 A1 May 31, 2018

(30) Foreign Application Priority Data

Nov. 28, 2016 (JP) ................................ 2016-230073

(51) Int. Cl.
*G03G 15/00* (2006.01)
*G06F 3/12* (2006.01)
(Continued)

(52) U.S. Cl.
CPC ........... *G06F 3/1215* (2013.01); *G03G 15/23* (2013.01); *G03G 15/231* (2013.01); *G03G 15/50* (2013.01); *G03G 21/14* (2013.01); *G06F 3/1219* (2013.01); *G06F 3/1234* (2013.01); *G06F 3/1275* (2013.01); *H04N 1/00572* (2013.01); *G03G 15/602* (2013.01); *G03G 15/6564* (2013.01); *H04N 2201/0094* (2013.01)

(58) Field of Classification Search
CPC ..................................................... G06F 3/1215
See application file for complete search history.

(56) References Cited

U.S. PATENT DOCUMENTS 5,847,857 A * 12/1998 Yajima .................. G06F 3/1215 358/468
2004/0190084 A1 * 9/2004 Shirai ................ H04N 1/32443 358/474

(Continued)

FOREIGN PATENT DOCUMENTS

JP 2000-280580 A 10/2000

*Primary Examiner* — Benjamin O Dulaney
(74) *Attorney, Agent, or Firm* — Venable LLP

(57) ABSTRACT

An image forming apparatus includes an image reader configured to perform image reading of a first original and perform image reading of a second original after reading of the first original, a printer configured to print a read image read by the image reader on a sheet, and a controller configured to control operation of the image reader and the printer. As to the first original, the controller is configured, in a case where the printer performs double-sided printing to print on both sides of a sheet, to start to print a read image of the first original before the image reading of the first original is completed, and as to the second original, the controller is configured, in a case where the printer performs double-sided printing to print on both sides of a sheet, to start to print a read image of the second original after the image reading of the second original is completed.

13 Claims, 12 Drawing Sheets

START
S301 JOB INTERRUPTION PROCESSING
S303 DISPLAY PAPER JAM PROCESSING AND ORIGINAL REPLACING INSTRUCTION
S304 DOUBLE-SIDE PRINTING JOB, ONE SHEET IS BEING PROCESSED IN PRINTER, IMAGE FORMATION ON FRONT SURFACE IS COMPLETED, AND IMAGE ON BACK SURFACE IS UNFORMED?
S305 IMAGE SCHEDULED TO BE FORMED ON BACK SURFACE CORRESPOND TO IMAGE INTERRUPTED DUE TO ORIGINAL JAM IN IMAGE READER?
S306 ORIGINAL REPLACED?
S307 STOP KEY PRESSED?
S308 PREDETERMINED TIME ELAPSE?
S311 HIDE JAM PROCESSING AND ORIGINAL REPLACING INSTRUCTION
S312 JOB RESTART PROCESSING
S310 JOB END PROCESSING
END

(51) Int. Cl.
*H04N 1/00* (2006.01)
*G03G 15/23* (2006.01)
*G03G 21/14* (2006.01)

(56) References Cited

U.S. PATENT DOCUMENTS

2015/0022835 A1* 1/2015 Mori ...................... G06K 15/16
358/1.12
2016/0170692 A1* 6/2016 Osada .................. H04N 1/0057
358/1.15

* cited by examiner

IMAGE FORMING APPARATUS HAVING DOUBLE-SIDED PRINTING AND CONTROL METHOD OF THE SAME

BACKGROUND OF THE INVENTION

Field of the Invention

The present disclosure relates to an image forming apparatus capable of performing double-sided printing of an image.

Description of the Related Art

An image forming apparatus called MFP (Multi-Function Printer) is known. In the MFP, it is desired to shorten FCOT (First Copy Output Time), a time to finish first output of an image-formed sheet after reading an original. This is because if the FCOT is long, a user is kept waiting. Also, it increases power consumption. Japanese Patent Application Laid-Open No. 2000-280580 discloses a technology to shorten the FCOT, in which image forming start timing is changed according to an image size obtained through image reading or an image forming speed. Thereby, the image formation is sometimes started even before the image reading is completed.

The technology disclosed in the Japanese Patent Application Laid-Open No. 2000-280580 can shorten the FCOT if an image reading operation is normal. However, like a paper jam of the original, for example, a problem still remains in that it cannot sufficiently handle an occurrence of trouble caused during the image reading. It means that even the image forming operation is normal, if printing on a sheet is not completed finally, even the printing on the sheet is completed halfway through, the sheet needs to be discharged, which wastes processing or sheet required so far for the image formation. In particular, when the double-sided printing is performed, in a case where image reading of a first original is properly completed and the image is correctly formed on a front surface of the sheet, the above problem becomes more remarkable.

The purpose of the present disclosure is to provide an image forming apparatus which does not waste a printing sheet even when trouble occurs during the image reading while shortening the FCOT.

SUMMARY OF THE INVENTION

An image forming apparatus according to the present disclosure includes: an image reader configured to perform image reading of a first original and perform image reading of a second original after reading of the first original; a printer configured to print a read image read by the image reader on a sheet; and a controller configured to control operation of the image reader and the printer, wherein, as to the first original, the controller is configured, in a case where the printer performs double-sided printing to print on both sides of a sheet, to start to print a read image of the first original before the image reading of the first original is completed, and: as to the second original, the controller is configured, in a case where the printer performs double-sided printing to print on both sides of a sheet, to start to print a read image of the second original after the image reading of the second original is completed.

Further features of the present invention will become apparent from the following description of exemplary embodiments (with reference to the attached drawings).

DESCRIPTION OF THE EMBODIMENTS

Figure 1:
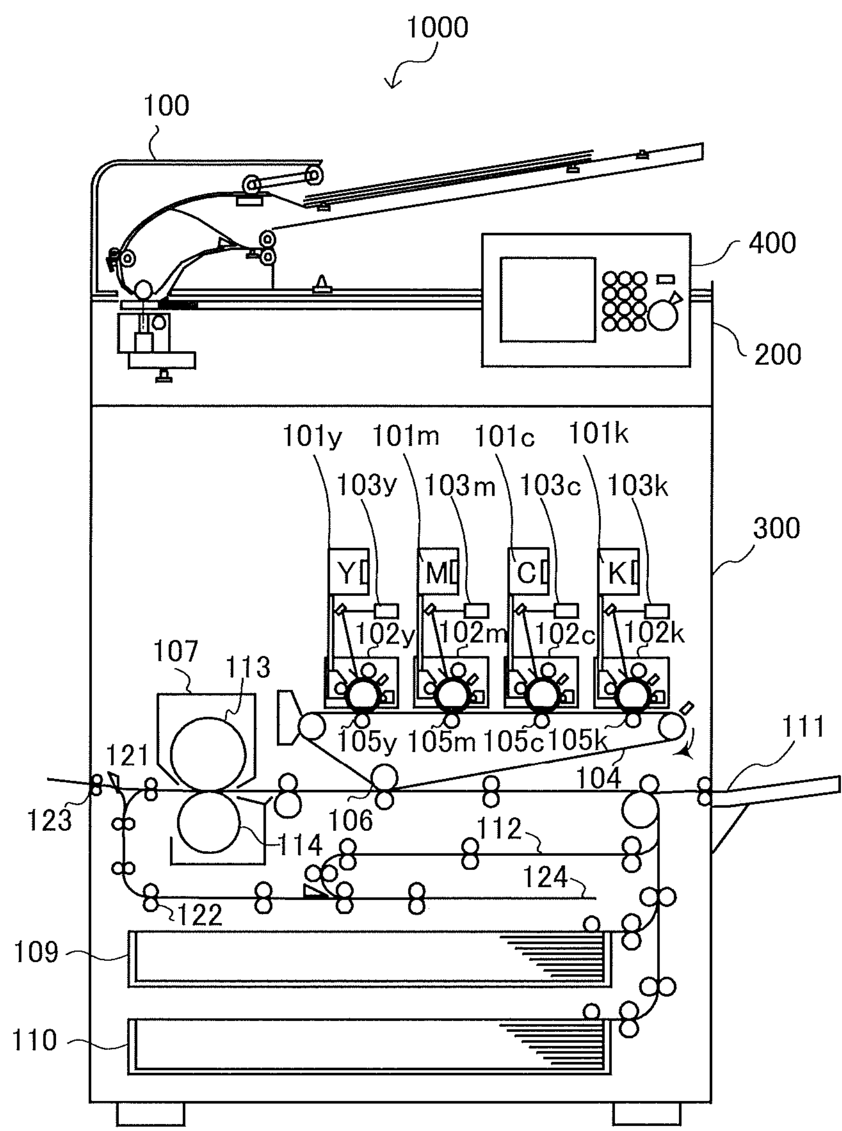
FIG. 1 is a cross-sectional view of an apparatus of an image forming apparatus according to a first embodiment.

Exemplary embodiments of an image forming apparatus according to the present disclosure are described hereinafter. As shown in FIG. 1, the image forming apparatus of the present embodiment comprises an ADF 100, an image reader 200, a printer 300, and a controller 400. The ADF (Auto Document Feeder) 100 is an automatic sheet feeding device comprising a double-sided original automatic reversing function. The ADF 100 can optionally perform single-sided image reading and double-sided image reading of a plurality of originals. There are double-sided originals in which only one surface is a surface to be read and single-sided originals in which both surfaces are the surfaces to be read. Thereby, in the explanation hereinafter, the original to be read first is called a "first surface original" and the original to be read next is called a "second surface original".

For example, in case of a single-sided original with a surface to be read, an original which is firstly fed is the first surface original and an original which is read after the first surface original is the second surface original. In case of the double-sided original in which both surfaces of the same are the surfaces to be read, a front surface is the first surface original and a back surface is the second surface original.

When performing the single-sided image reading, the surfaces to be read of the first surface original and the second surface original are respectively conveyed to a predetermined reading position of the image reader 200 at a constant speed. On the other hand, when performing the double-sided image reading, the first surface original and the second surface original obtained by reversing the first surface original are conveyed to the above reading position. The image reader 200 sequentially reads the first image of the original and the second surface original fed through the ADF 100. The image reader 200 then outputs the read images to the controller 400 as image data. The read image data is referred to as "read image". The controller 400 applies predetermined image processing to the read image before outputting the read image to the printer 300. Also, the controller 400 determines output timing of the read image to the printer 300. The printer 300 prints read data transmitted from the controller 400 on a predetermined recording sheet. The sheet may or may not be paper medium, however, in the present embodiment, it is called "sheet" for convenience. The printer 300 optionally performs the single-sided printing and the double-sided printing. The single-sided printing means a printing mode in which the read image of the first surface original and the read image of the second surface original are respectively printed on one surface of a different sheet. The double-sided printing means a printing mode in which, after printing the read image of the first surface original on a front surface of one sheet, front and back surfaces of the sheet are reversed. Then, the read image of the second surface original is printed on the back surface of the sheet.

As an image forming system, the printer 300 comprises exposure control units 103$y$, 103$m$, 103$c$, and 103$k$ for each color of yellow (y), magenta (m), cyan (c) and black (k) (hereinafter, if it is not necessary to distinguish the exposure control unit by color, it is described as exposure control unit 103). The exposure control unit 103 irradiates laser light of an output corresponding to the read image to photosensitive drums 105$y$, 105$m$, 105$c$, and 105$k$ (hereinafter, if it is not necessary to distinguish the photosensitive drum by color, it is described as photosensitive drum 105.). This forms an electrostatic latent image on a surface of the photosensitive drum 105. The electrostatic latent image is developed by developing devices 102$y$, 102$m$, 102$c$, and 102$k$. It means that toners 101$y$, 101$m$, 101$c$, and 101$k$ (hereinafter, if it is not necessary to distinguish the toner by color, it is described as toner 101) are adhered to the surface of the photosensitive drum 105. The toner 101 of each color is transferred to the sheet fed from any of cassettes 109 and 110 and a manual sheet feeding unit 111 at a secondary transfer portion 106. Fixing processing of the toner 101 is then applied to the sheet to which the toner 101 is transferred to a fixing device 107. The fixing device 107 comprises a fixing roller 113 which includes a heater and a pressurizing roller 114. By applying heat and pressure using them, the toner 101 is fixed on the sheet. Depending on a type of the sheet, each temperature of the fixing roller 113 and the pressurizing roller 114 is set to an optimum temperature. The sheet on which the toner 101 is fixed is delivered from a discharge port 123.

When reading the image of the original by the image reader 200 to perform the image formation on the one surface of the sheet, it is preferable to read the image in the same order as the page order of the original, perform the image formation and discharge the sheet. In this case, the sheet is reversed before it is discharged. Thereby, in the present embodiment, after the fixing processing of the toner 101, after conveying the sheet in a direction of a conveying roller 122 with a flapper 121, the conveying roller 122 is temporarily stopped. Further, the conveying roller 122 is reversed and the sheet is conveyed again in a direction of the discharge port 123 with the flapper 121.

On the other hand, when performing the image formation on both sides of the sheet, after performing the image formation on the one side, the sheet is conveyed in a direction of the conveying roller 122 with the flapper 121. Then, after temporarily stopping the sheet at a double-sided reversing unit 124, through a double-sided conveying path 112, the toner is transferred to the other side at the secondary transfer portion 106 to perform the image formation. As a result, the image of the original is formed so that the smaller page of the read pages becomes a lower surface of the sheet. Thereby, the image-formed sheet is discharged in the same order as the page order of the original to be read. It is noted that image forming order is not always the same as the page order. For example, the image formation is sequentially performed as follows; front of page 1, front of page 2, front of page 3, back of page 1, front of page 4, back of page 2, front of page 5, back of page 3, front of page 6, back of page 4 and the like.

When performing the image formation on both sides of the sheet, the sheet always stops temporarily at the double-sided reversing unit 124. Thereby, after performing the image formation on the one side, even a start of transfer of the read image from the controller 400 to the other side is delayed, it is possible to make the sheet stand by at the double-sided reversing unit 124. "Printer output", described later, is performed during a period from when the sheet feeding is started from the cassettes 109, 110 and the like, and until when the image formation is completed. However, other configurations may be employed. In one example, after the sheet feeding, the sheet is conveyed in advance in front of the secondary transfer portion 106. In this case, the printer output is performed during a period from when exposure is started at the same time output of the read image from the controller 400 is started, and until when fixing of the image of a final main scanning line of the read image is completed. In the present embodiment, a description is provided for the latter case.

Control Method of Image Formation

Figure 2:
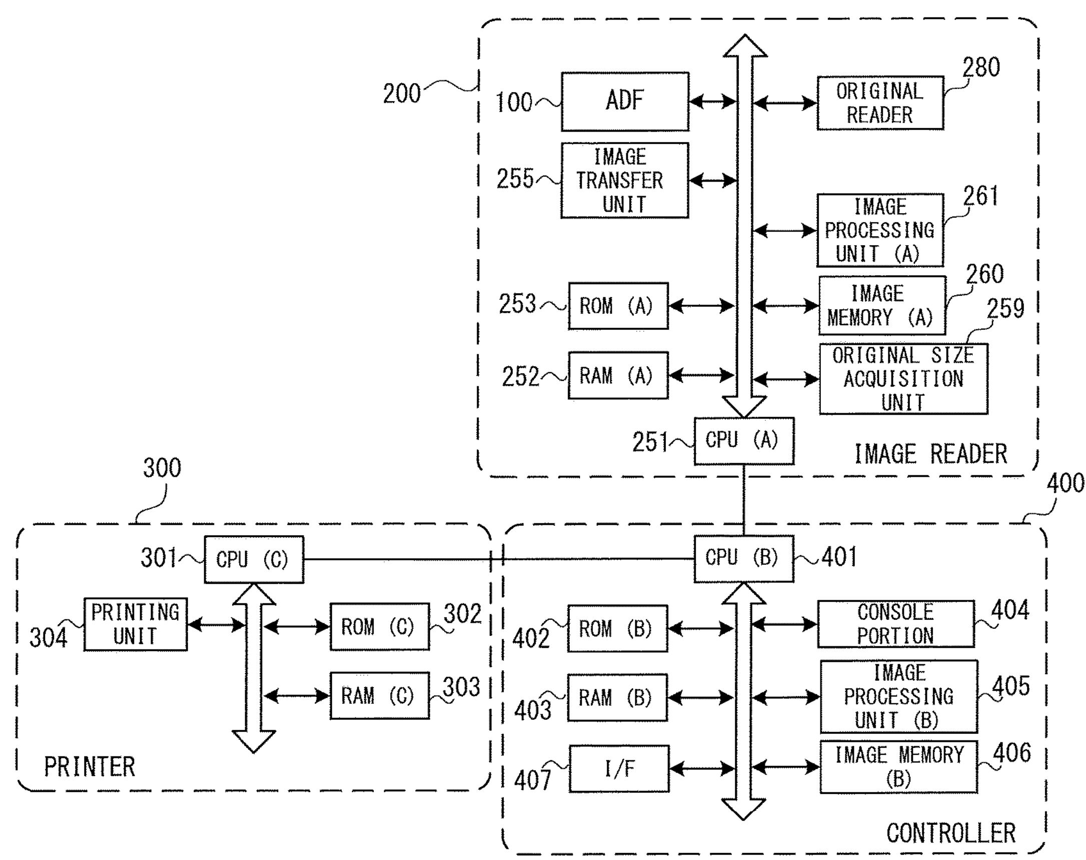
FIG. 2 is a hardware configuration diagram of a control system of the image forming apparatus.

In an image forming apparatus 1000 of the present embodiment, the image reader 200, the printer 300, and the controller 400 cooperatively operate. FIG. 2A shows a configuration example of a control system for realizing the control method therefor. Each of the image reader 200, the printer 300, and the controller 400 comprises a control computer including a CPU, a RAM, and a ROM as main components. The CPU (Central Processing Unit, the same shall apply hereinafter) performs operation control of the component of the unit by performing a control program. The RAM (Random Access Memory, the same shall apply hereinafter) is a rewritable memory, which is used as a main memory for the CPU, and which is also used as a temporary storage area such as a work area and the like. The ROM (Read Only Memory, the same shall apply hereinafter) is a read only memory in which an operating system (OS), the above control program, a device driver, parameter data and the like are stored.

The image reader 200 comprises a CPU(A) 251, a RAM (A) 252, and a ROM(A) 253. The image reader 200 also comprises an image transfer unit 255, an original size acquisition unit 259, an image memory(A) 260, an image processing unit(A) 261, and an original reader 280. The CPU(A) 251 totally controls these function blocks. The CPU(A) 251 also controls the operation of the ADF 100. Thereby, in FIG. 2, the ADF 100 is described in the image reader 200. The image transfer unit 255 comprises a clock generating function. Based on a generated clock, the image transfer unit 255 transfers the read image of the image memory(A) 260 to the controller 400. The original size acquisition unit 259 acquires an original size from a size detecting sensor (described later) provided on a tray. Before outputting the read image to the controller 400, the image processing unit(A) 261 applies predetermined image processing to the read image. The original reader 280 scans the original to perform the image reading by every single line. Further, the original reader 280 comprises a clock generating function. The original reader 280 stores the read image for the number of lines corresponding to a plurality of pages (a plurality of surfaces) in the image memory(A) 260 in synchronization with the generated clock.

The printer 300 comprises a CPU(C) 301, a ROM(C) 302, a RAM(C) 303. The printer 300 also comprises a printing unit 304. The CPU(C) 301 controls the printing unit 304. The controller 400 comprises a CPU(B) 401, a ROM(B) 402, a RAM(B) 403. The controller 400 also comprises a console portion 404, an image processing unit(B) 405, an image memory(B) 406, and an I/F 407. A description with regard to a function of the console portion 404 will be provided later. The image processing unit(B) 405 performs predetermined image processing including rotation processing of the read image, change of an output size when printing of the read image and the like. The image memory(B) 406 stores the read image which is transferred from the image reader 200. It also stores the read image received via the I/F 407. The I/F 407 is connected to network which corresponds to communication protocol such as TCP/IP and the like. The I/F 407 receives an instruction to execute a print job from a computer (not shown) connected to the network and sends information from the image forming apparatus 1000 to the computer. It is noted that, in the present embodiment, information representing a series of image forming operations on a single sheet or a plurality of sheets with an instruction to start the image forming operation is described as a "job". The CPU(A) 251, the CPU(B) 401, and the CPU(C) 301 cooperate to constitute a control means. Thereby, to allow mutual information transfer, the CPU(A) 251, the CPU(B) 401, and the CPU(C) 301 are connected through a communication line.

Figure 3:
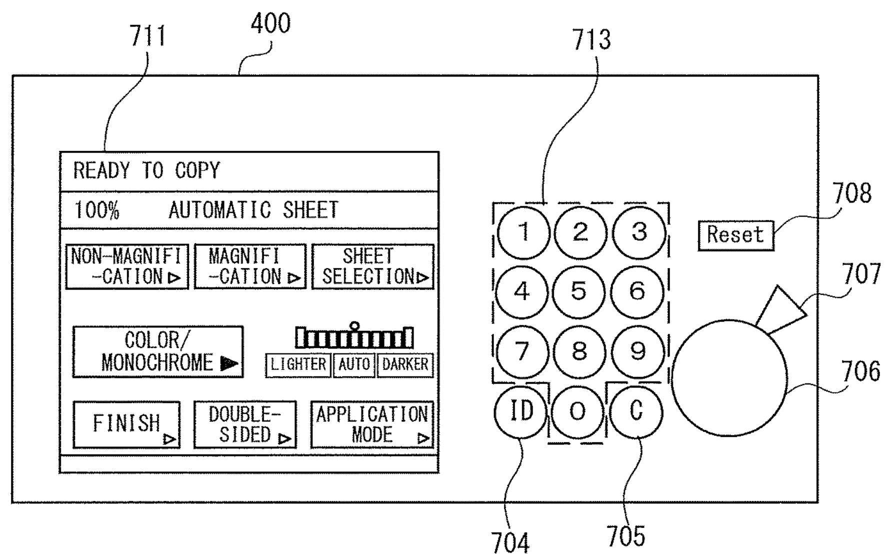
FIG. 3 is a diagram showing a configuration example of an operation panel of a console portion.

A description is provided with regard to the console portion 404 of the controller 400. The console portion 404 is an interface device for presenting monitoring information and setting information to a user and inputting an instruction from the user, which comprises an operation panel. For example, a display and a numeric keypad with a touch panel mounted thereon are arranged on the operation panel. FIG. 3 shows a configuration example of the operation panel. Referring to FIG. 3, an ID key 704, a clear key 705, a start key 706, a stop key 707, a reset key 708, a display screen 711, and a numeric keypad 713 are arranged on the operation panel. The ID key 704 is a key used to input or confirm ID which is authority information. The clear key 705 is a key used to clear input which is input so far. The start key 706 is a key used to depress when starting the image forming operation. The stop key 707 is a key used to depress when interrupting the image forming operation. The numeric keypad 713 is a key used to depress when setting numeric.

The display 711 is a display on which a touch panel is formed. Through a user's finger touch and the like, the display 711 can show an operable soft key. For example, when selecting "sheet selection" on the display 711, a sheet selection screen is displayed. Also, when selecting "magnification" on the display 711, printing magnification is displayed. Also, the single-sided image reading, the double-sided image reading, the single-sided printing, and the double-sided printing can be instructed through the operation panel. Various data which are input in the console portion 404 are stored in the RAM(B) 403 through the CPU(B) 401.

Configuration and Operation of Image Reader

Figure 4:
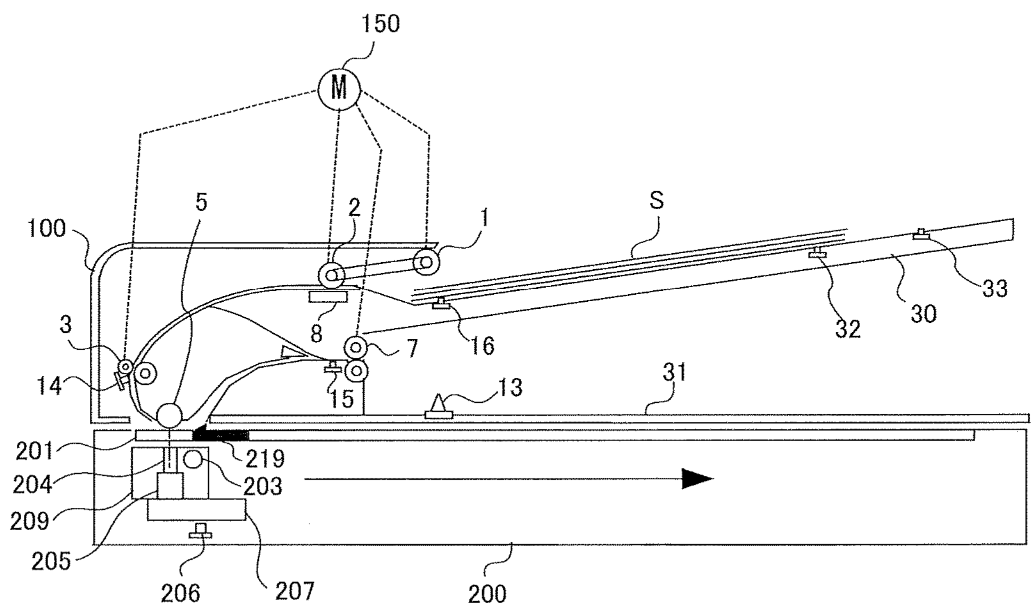
FIG. 4 is a cross-sectional view showing a configuration example of an image reader which performs image reading.

FIG. 4 is a cross-sectional view showing a configuration example of the image reader 200. The original reader 280 shown in FIG. 2 comprises, in the example of FIG. 4, a scanner unit 209, an LED 203, a lens 204, an image sensor 205 and the like. The original reader 280 comprises a function block or a clock generating unit which generates a clock. The clock determines operation timing of the scanner unit 209 and detection timing of the image sensor 205. A home position detecting sensor 206 is provided on a bottom part of a housing of the image reader 200. Further, a home position detection flag is provided on a lower part of the scanner unit 209. The scanner unit 209 moves in an arrow direction in FIG. 5. At that time, based on a detection results of the home position detecting sensor 206 and the home position detection flag 207, position of the scanner unit 209 is adjusted.

The CPU(A) 251 controls the ADF 100 and the image reader 200. When the ADF 100 starts an original reading job, the scanner unit 209 moves to a position immediately below a reference white plate 219 and shading is executed. The shading is processing which normalizes a reading level in reading the original. Thereby, an output value from the image sensor 205 while the LED 203 is turned off (black) and the output value from the image sensor 205 while the LED 203 is turned on (white) are sampled. After executing the shading, the scanner unit 209 moves to a position immediately below a platen glass 201 and stands by until the original reaches the reading position.

Single-Sided Original Reading

A description is provided with regard to an operation example of reading the one side of the original in the image reader 200. Here, an example is shown with regard to a case where the user places an original bundle S consisting of a plurality of originals on an original tray 30 and only the one side of each original is read. An original presence/absence detecting sensor 16 for detecting the presence/absence of the original and size detecting sensors 32 and 33 for detecting a size of the original are mounted on the original tray 30. When the CPU(A) 251 detects that the user places the original bundle S on the original tray 30, the CPU(A) 251 lowers a sheet feeding roller 1 toward the original bundle S. Furthermore, when the sheet feeding roller 1 stops lowering, the CPU(A) 251 starts to rotate the sheet feeding roller 1. This starts sheet feeding of the original of the uppermost position among the original bundle S. Even two originals are overlappingly conveyed by the sheet feeding roller 1, the originals are separated one by one by action of a separation roller 2 and a separation pad 8, which suppresses overlap feeding of the original. A conveying motor 150 as a driving source of the sheet feeding roller 1 and a separation roller 2 becomes a driving source common to a registration roller 3 and a sheet discharge roller 7. It means that these rollers 1, 2, 3, and 7 rotate in conjunction with a rotation of the conveying motor 150 which is one driving source. It is noted that even when the conveying motor 150 rotates in any of normal and reverse directions, the registration roller 3 rotates normally. The normal rotation means a rotation of the original from the original tray 30 to a direction toward a sheet discharge tray 31. The CPU(A) 251 starts to count a driving clock at timing when the sheet feeding roller 1 lowers to feed the sheet and the conveying motor 150 starts to rotate for conveying the original.

In a case where the number of drive clocks of the conveying motor 150 exceeds a predetermined value until the read sensor 14 detects a leading edge of the original after the sheet feeding roller 1 is lowered, the CPU(A) 251 recognizes that the separation roller 2 fails to separate the original from the original bundle S. It means that the CPU(A) 251 recognizes that paper jam (delay jam) of the original occurs.

A conveying path for conveying the original to a direction of the platen glass 201 is provided on a downstream side of the registration roller 3. The original is sent to the conveying path and conveyed through an original reading position between an original reading platen roller 5 and the platen glass 201. Based on timing when the read sensor 14 detects the leading edge of the original, it is detected that the leading edge of the original reaches the original reading position. It means that the CPU(A) 251 starts to count the drive clock of the conveying motor 150 again from the timing when the read sensor 14 turns ON (detects presence of original). A rotation amount of the registration roller 3 per drive clock is previously known. Thereby, the CPU(A) 215 can detect timing when an original leading edge position reaches the original reading position of the platen glass 201 from the drive clock number from the timing when the read sensor 14 turns ON. Using the timing, the CPU(A) 251 starts original image reading in the scanner unit 209.

The original which passes through the reading position of the platen glass 201 is guided to a sheet discharge path in a direction of the sheet discharge roller 7 on a downstream side of the original reading platen roller 5. The CPU(A) 251 counts from timing when the original image reading is started until when the read sensor 14 turns OFF (detects trailing edge of the original) using the number of drive clocks of the conveying motor 150. Then, in a case where the read sensor 14 does not turn OFF even when a predetermined number of driving clocks is counted during the original reading, the CPU(A) 251 recognizes that the paper jam (retention jam) of the original occurs.

On the other hand, when the read sensor 14 turns OFF, the CPU(A) 251 recognizes that the trailing edge of the original passes through the read sensor 14 at that point. Then, the CPU(A) 251 determines a length of the original from the number of drive clocks counted so far. Timing to start counting the drive clock is the same as the timing to start the original image reading. Thereby, the CPU(A) 251 multiplies the counted number of drive clocks and moving distance per drive clock and adds a distance from the read sensor 14 to the reading position. This is how the length of the original is determined.

When the read sensor 14 detects the trailing edge of the original, the presence/absence of the next original on the original tray 30 is detected by the original presence/absence detecting sensor 16. The detection result is notified to the controller 400 through the CPU(A) 251. When the original is conveyed, the trailing edge of the original passes through the separation roller 2, the registration roller 3, an original pre-reading roller 4, and the original reading platen roller 5 in order and the trailing edge of the original is detected by a sheet discharge sensor 15. After a predetermined time elapses from the detection of the trailing edge of the original, discharge of one original from the sheet discharge roller 7 to the sheet discharge tray 31 is completed using detection timing of the trailing edge of the original by the sheet discharge sensor 15 as a trigger. This completes the single-sided original reading and conveyance sequence of one original.

The original sheet feeding, the original image reading, and the original discharge are repeated until no original remains on the original tray 30. If an original absence state is detected, the CPU(A) 251 determines that the original which is being conveyed is a final original and waits until the final original is discharged on the sheet discharge tray 31. After the discharge, the CPU(A) 251 stops driving the conveying motor 150, brings the sheet feeding roller 1 back to an original position, and finishes the original reading job.

It is noted that when the original is discharged on the sheet discharge tray 31, the original depresses a detection flag of a discharged original presence/absence sensor 13 provided on the sheet discharge tray 31. This changes the detection result of the discharged original presence/absence sensor 13, which allows detection of the presence/absence of the original on the sheet discharge tray 31.

Reverse Reading of Double-Sided Original

Figure 5:
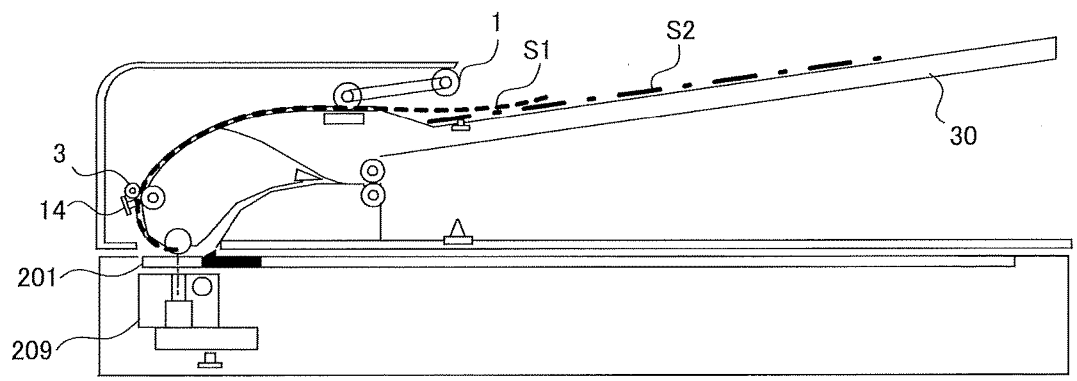
FIG. 5 is a cross-sectional view showing one state during a single-sided image reading operation in the image reader.

Next, a description is provided with regard to an operation in which the first surface original and the second surface original are read from both sides of one original in the image reader 200. An original feeding device of the present embodiment does not comprise both a reading element for a front surface image and a reading element for a back surface image. The original feeding device of the present embodiment is configured to first read the image of one surface of the original. Thereafter, it reverses front and back of the original to read the image of the other surface of the original. A description is omitted with regard to control contents of the scanner unit 209 as it is the same as the operation of the single-sided original reading. Referring to FIG. 5, the ADF 100 starts the sheet feeding of the original S1 on top of the original tray 30. A second surface original S2 stays as it is. When the CPU(A) 251 detects the leading edge of the original S1 by the read sensor 14, the image reader 200 temporarily stops driving the conveying motor 150. Thereafter, the image reader 200 reversely rotates the conveying motor 150 by a predetermined distance. At that time, as shown in FIG. 5, it raises the sheet feeding roller 1. This avoids the sheet feeding of the next original S2 from the original tray 30. It is noted that even when the conveying motor 150 reversely rotates, the registration roller 3 rotates in a direction which conveys the original S1 to a downstream side. When the conveying motor 150 is normally rotated in this state again, the original S1 moves in a direction of the platen glass 201. As described in the single-sided original reading, by the counting of the drive clock of the conveying motor 150, the image reading of the front surface of the original is started in the scanner unit 209 at timing when the leading edge of the original S1 is assumed to reach the original reading position. Thereafter, as in the case of the single-sided original reading, the scanner unit 209 stands by until the trailing edge of the original S1 passes through the read sensor 14.

Figure 6:
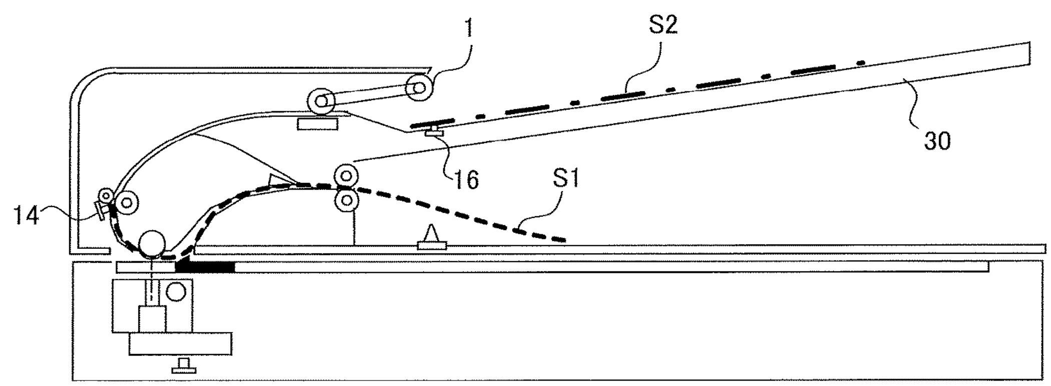
FIG. 6 is a cross-sectional view showing one state during the single-sided image reading operation in the image reader.

FIG. 6 shows a state of timing when the trailing edge of the original S1 passes through the read sensor 14. When the read sensor 14 turns OFF, similar to the case of the single-sided original reading, the CPU(A) 251 recognizes that the trailing edge of the original S1 passes through the read sensor 14 at that point and determines the length of the original S1. Furthermore, the CPU(A) 251 detects whether the next original S2 is present or not on the original tray 30 by the original presence/absence detecting sensor 16. At this point, since the image of the first side of the original S1 is being read, the original presence/absence detecting sensor 16 detects that the second surface original, i.e., the next original S2, remains on the original tray 30. As the sheet feeding roller 1 is raised, the next original S2 still stays at an original position. Further, the trailing edge of the original S1 is at the position of the read sensor 14. Thereby, similar to the case of the single-sided original reading, the reading operation is controlled to finish the original image reading at the time point when the trailing edge of the original S1 reaches the reading position. Thereafter, front and back reversing processing is performed to the original S1 of which the image reading of the front surface is completed.

Figure 7:
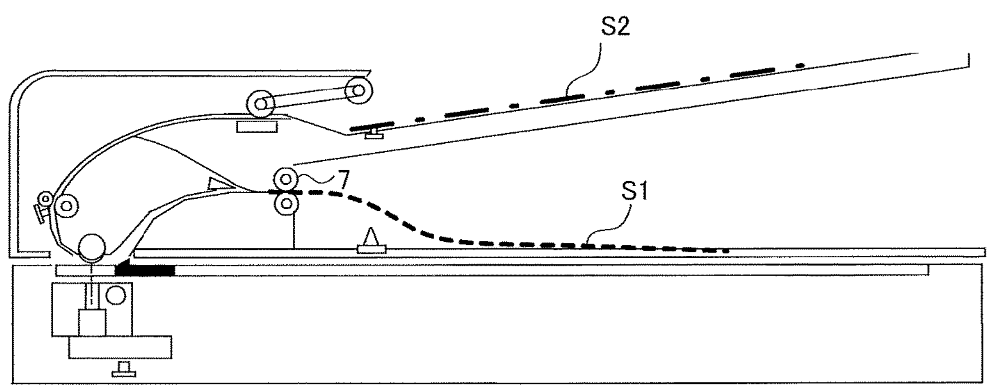
FIG. 7 is a cross-sectional view showing one state during the single-sided image reading operation in the image reader.
Figure 8:
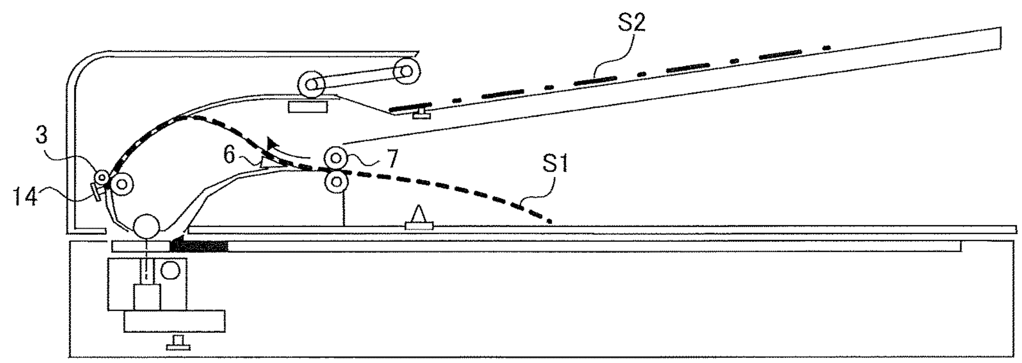
FIG. 8 is a cross-sectional view showing one state during a double-sided image reading operation in the image reader.

In particular, as shown in FIG. 7, the CPU(A) 251 conveys the original S1 immediately before the sheet discharge roller 7. Then, the CPU(A) 251 temporarily stops driving the conveying motor 150. Then, the CPU(A) 251 reversely rotates the conveying motor 150 to reversely rotate the sheet discharge roller 7. At this time, as shown in FIG. 8, the original S1 which is conveyed to a left side in FIG. 8 from a position of the sheet discharge roller 7 is conveyed in an arrow direction in FIG. 8 by a reversing flapper 6. It is noted that when the conveying motor 150 reversely rotates, the sheet discharge roller 7 also reversely rotates but the registration roller 3 normally rotates. Thereby, the registration roller 3 can convey the original S1 in a direction of the reading position. Again, the CPU(A) 251 counts the drive clock of the conveying motor 150 from the start time point of the reverse rotation of the conveying motor 150. Then, in a case where the number of the drive clocks reaches a predetermined value until the read sensor 14 detects the presence of the original, the CPU(A) 251 recognizes that the paper jam of the original (delay jam) occurs.

Figure 9:
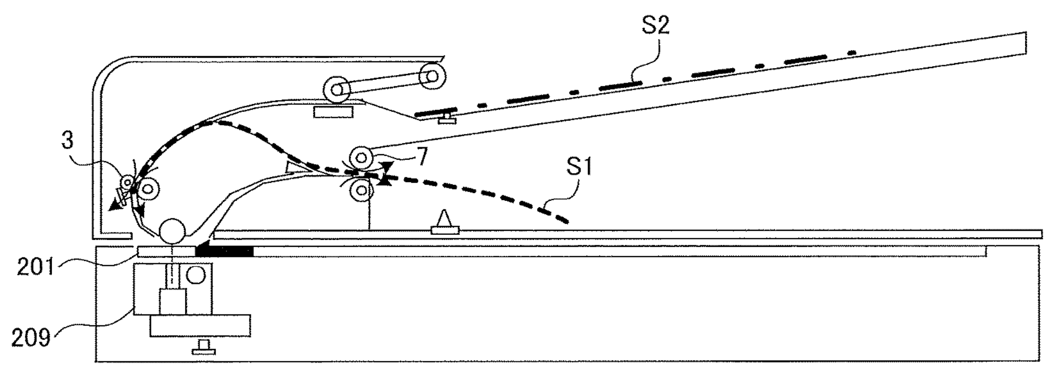
FIG. 9 is a cross-sectional view showing one state during the double-sided image reading operation in the image reader.
Figure 10:
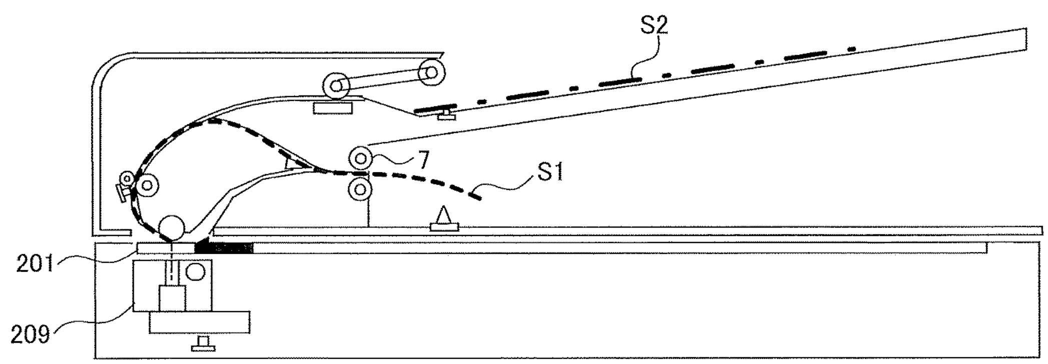
FIG. 10 is a cross-sectional view showing one state during the double-sided image reading operation in the image reader.

As mentioned, the CPU(A) 251 conveys the original S1 with the sheet discharge roller 7 by reversely rotating the conveying motor 150. When the read sensor 14 detects the presence of the original, the CPU(A) 251 stops driving the conveying motor 150. Thereafter, the CPU(A) 251 drives a solenoid (not shown) for separating the sheet discharge roller 7 and normally rotates the conveying motor 150 again. When the conveying motor 150 normally rotates, as shown in FIG. 9, both the registration roller 3 and the sheet discharge roller 7 normally rotate but the sheet discharge roller 7 is separated. Thereby, the original S1 is conveyed by the registration roller 3. If the sheet discharge roller 7 is not separated in this state, in a state shown in FIG. 9, the registration roller 3 attempts to convey the original S1 in a direction of the original reading position whereas the sheet discharge roller 7 attempts to convey the original in a sheet discharge direction, which prevents the sheet from being conveyed normally. Thereafter, similar to the case of the single-sided original reading, the CPU(A) 251 starts to count the drive clock from the start of driving the conveying motor. Then, at timing when the leading edge of the original S1 reaches the reading position of the platen glass 201, the CPU(A) 251 starts the image reading of the original S1 in the scanner unit 209. FIG. 10 shows this state.

The original S1 is switchback-conveyed from the state shown in FIG. 7 but the length of the original S1 is determined in the operation of reading the image of the front surface of the original S1. Based on the data of the length of the original, the CPU(A) 251 sets start timing of abutting operation of the sheet discharge roller 7.

Figure 11:
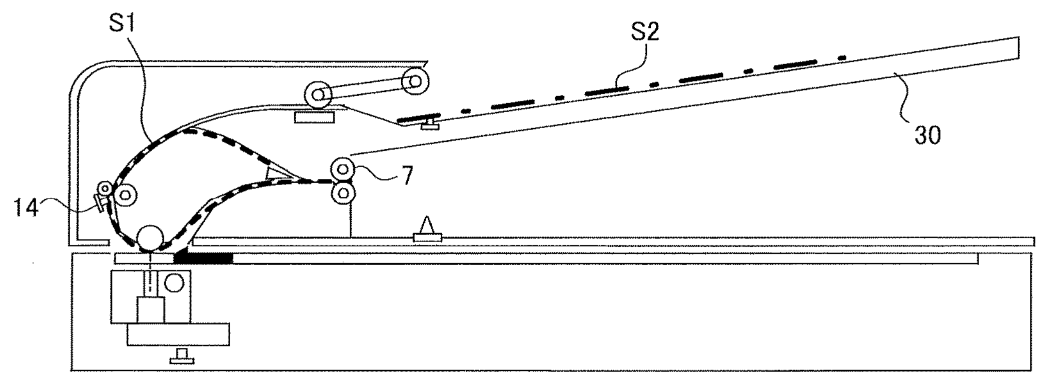
FIG. 11 is a cross-sectional view showing one state during the double-sided image reading operation in the image reader.

At the start of the image reading of the back surface of the original as shown in FIG. 10, the sheet discharge roller 7 is still in a separated state. As shown in FIG. 11, when the original S1 passes through the sheet discharge roller 7, abutting the sheet discharge roller 7 which is separated causes no problem. So, the CPU(A) 251 determines timing to abut the sheet discharge roller 7 based on the length of the original determined when reading the front surface and a conveying distance from when the sheet discharge roller 7 starts the reverse rotation until when the read sensor 14 detects the original S1. After abutting the sheet discharge roller 7, the CPU(A) 251 waits until the read sensor 14 turns OFF. As the length of the original is already known, a time required until the occurrence of the retention jam (margin) is determined can be set to an appropriate value. In the present embodiment, for example, 5% of the length of the original determined when reading the front surface is determined as the margin of the retention jam. If the length determined when reading the front surface is A4 size (the length in a conveying direction, 297.0 mm), the CPU(A) 251 sets the margin based on a distance obtained by adding 14.85 mm (=297.0*0.05) with respect to a distance from the trailing edge position of the original to the read sensor 14 at the time point when the sheet discharge roller 7 starts to abut. The CPU(A) 251 counts the number of drive clocks of the conveying motor corresponding to the margin to determine the occurrence of the paper jam.

After detecting the trailing edge of the original by the read sensor 14, similar to the case of the single-sided original reading, the CPU(A) 251 calculates the length of the original of the back surface and determines timing to complete the image reading. Basically, the length of the original of the back surface should match that of the original of the front surface. However, the conveying path when reading the image of the front surface is different from the conveying path when reading the image of the back surface, which sometimes generates 1 to 2 mm difference therebetween. Thereby, to align head of the read image of the front and back surfaces as obtained, the length of the original when reading the image of the back surface is also calculated. It is noted that whether the next original is present or not on the original tray 30 is not determined again as it is already determined when reading the image of the front surface.

Figure 12:
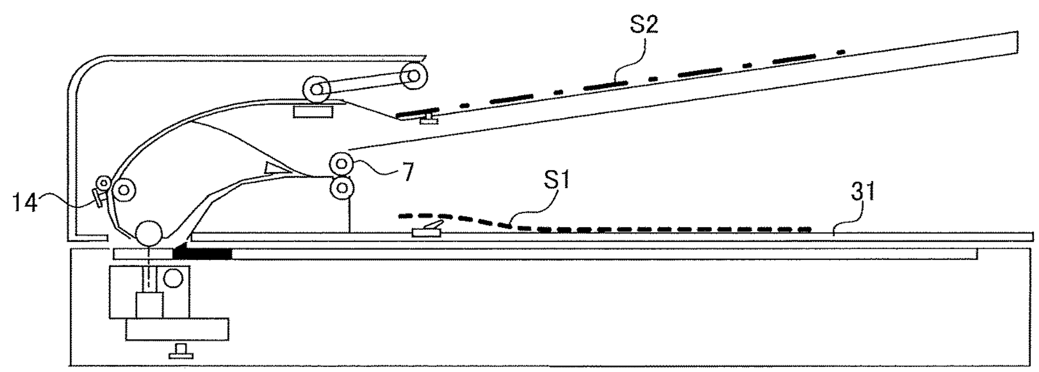
FIG. 12 is a cross-sectional view showing one state during the double-sided image reading operation in the image reader.

When the image reading of the back surface of the original is completed, the CPU(A) 251 performs the reversing processing again so that the front surface of the original is downwardly discharged. It means that immediately before the trailing edge of the original reaches the sheet discharge roller 7, the CPU(A) 251 stops the conveying motor 150. Then, the CPU(A) 251 reversely rotates the conveying motor 150. Then, when the original the direction of which is reversed through the reverse operation reaches the read sensor 14, the CPU(A) 251 drives the solenoid to separate the sheet discharge roller 7 and normally rotates the conveying motor 150. At this point, the original is reversed twice. Thereby, by discharging the original to the sheet discharge tray 31 as it is, the direction of the original on the sheet discharge tray 31 becomes the same as the case of the single-sided original reading. FIG. 12 shows this state. Such operation is called surface matching operation. The surface matching operation is the operation required to discharge the original so as to have the same surface relation with the case where the single-sided reading is performed even when the double-sided reading is performed.

Input/Output of Image Memory

Figure 13:
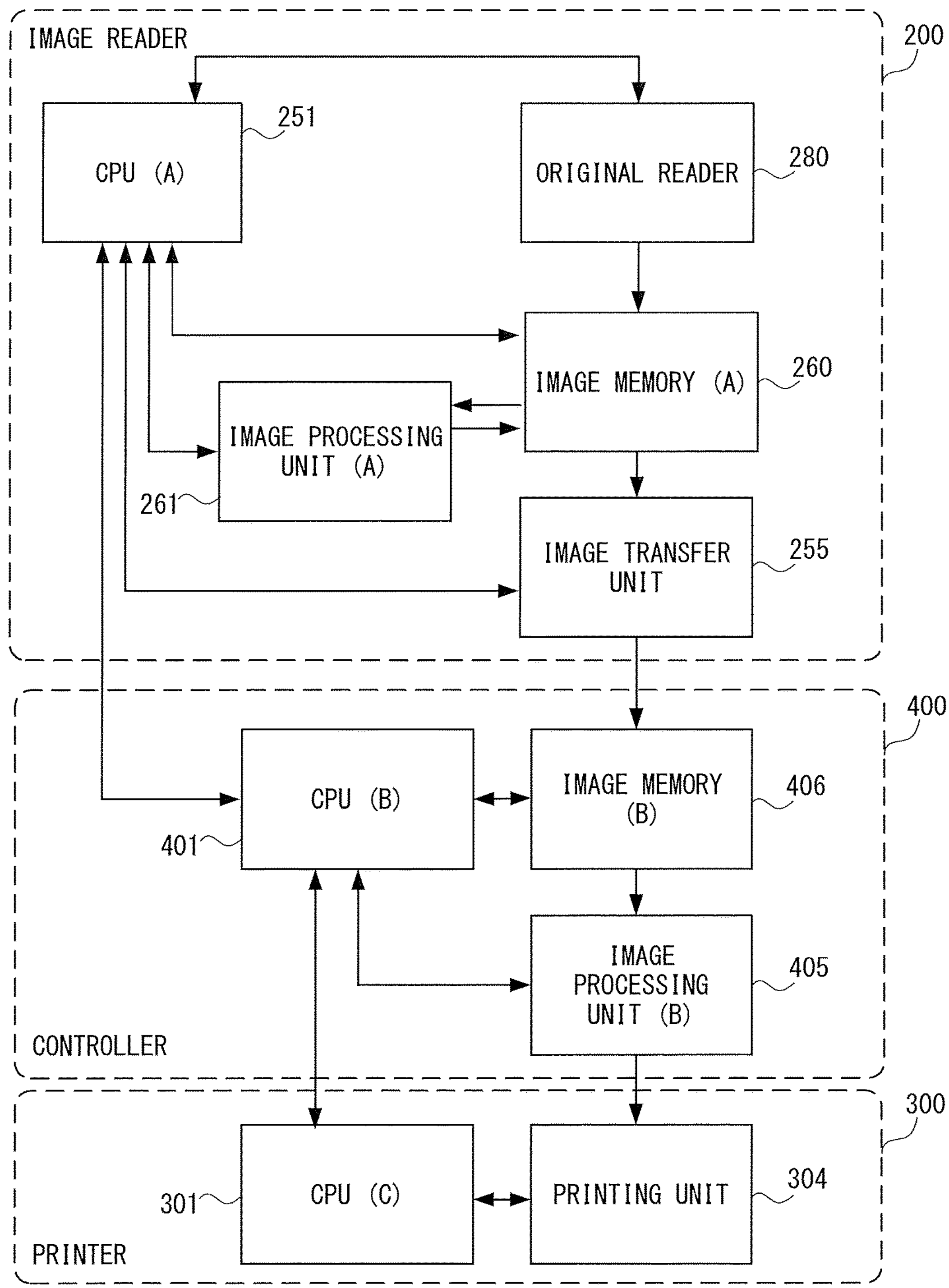
FIG. 13 is a block diagram showing a flow of data in the control system of the image forming apparatus.

In the present embodiment, an image memory(A) 260 is arranged in the image reader 200 and an image memory(B) 406 is arranged in the controller 400. FIG. 13 shows a flow of various data after the original image reading. Referring to FIG. 13, the CPU(A) 251 transfers data with each part of the image reader 200. In addition, the CPU(A) 251 transfers data with the CPU(B) 401 of the controller 400. Further, the CPU(B) 401 transfers data with the CPU(C) 301 of the printer 300.

In FIG. 13, before starting the original image reading in the original reader 280, the CPU(A) 251 of the image reader 200 secures a storage area for the read image in the image memory(A) 260. When the original image reading is started, the CPU(A) 251 sequentially stores the read image in the secured area in the image memory(A) 260. Predetermined image processing is applied to the stored read image in the image processing unit(A) 261, which is again stored in the image memory(A) 260. The read image stored in the image memory(A) 260 is transferred to the controller 400 through the image transfer unit 255. As to the storage and output timing of the read image from the image memory(A) 260 is described later.

Here, there are two reasons to provide the image memory (A) 260. One reason is to allow transfer of the read image to the controller 400 at arbitrary timing by storing the read memory in the image memory(A) 260. This is effective in improving throughput even when, for example, delay occurs in the image processing by the controller 400. If the read image is not stored in the image memory(A) 260, when the delay occurs in the image processing by the controller 400, the image forming apparatus 1000 needs to stop conveying the original and stand by until the controller 400 is ready to receive the next read image. On the other hand, if the read image is set to be stored in the image memory(A) 260, unless the image memory(A) 260 becomes full, it is possible to perform control of the image reading without stopping control of the conveyance of the original during a period until the controller 400 is ready to receive the next read image. Then, as soon as the controller 400 is ready to receive the next read image, by transferring the read image stored by that time, reduction of the throughput as a whole can be prevented or reduced.

The other reason is that the image processing unit(A) 261 can perform predetermined image processing without reducing the throughput before the image reader 200 transfers the read image stored in the image memory(A) 260 to the controller 400. For example, by conveying a large amount of originals, dirt such as paper dust on the original, paste residue of sticky note attached to the original and the like are easily attached on the platen glass 201 and the platen roller 5. As a result, a dust image (dust read image) is included in the read image. The dust read image can be removed by image correction performed by the image processing unit(A) 261. However, removal of the dust read image is performed by using the read image around the dust so that it cannot obtain the same image quality as that of the original read image. However, as to the dust attached to a platen roller 5 side, viewing from a scanner unit 209 side, it is interrupted by the original so that no correction is required. To determine whether it is data which requires no correction, the CPU(A) 251 first stores the read image of each original in the image memory(A) 260. Then, based on an attribute unique to the original being an individual surface to be read, the CPU(A) 251 determines whether the image processing on the surface is required or not and avoids the image processing for the read image of the surface which requires no image processing. In particular, for example, the CPU(A) 251 compares the dust read image during a period when there is no original at the reading position with the read image for a predetermined distance from the leading edge of the original. Then, the CPU(A) 251 detects the dust read image which requires the correction and avoids the image processing other than that to realize the minimum correction. This provides the read image with high image quality to the user even when, for example, the controller 400 only comprises a simple image processing function.

By the way, as mentioned, the original reader 280 of the image reader 200 comprises the clock generating function. The original reader 280 transfers the read image to the image memory(A) 260 in synchronization with the generated clock. In the present embodiment, a frequency of the clock is defined as "memory input frequency". On the other hand, as mentioned, the image transfer unit 255 also comprises the clock generating function. The image transfer unit 255 transfers the read image from the image memory(A) 260 to the image memory(B) 406 in synchronization with the generated clock. In the present embodiment, the clock is defined as "memory output frequency". In accordance with an instruction from the CPU(A) 251, the image transfer unit 255 (clock generating function) can generate a clock of arbitrary frequency.

It is noted that it is desired to set the memory output frequency as high as possible with respect to the memory input frequency to enhance the throughput of the image reading. In the present embodiment, the memory input frequency is set to 20 MHz. As the memory output frequency, a first memory output frequency (20 MHz) and a second memory output frequency (40 MHz) are provided. The first frequency is less than the second frequency and higher than an image forming (exposure) frequency of the printer 300. Further, original reading speed is faster than image printing speed. It means that the number of image reading sheets per unit time in the image reader 200 is larger than the number of printing sheets per unit time in the printer 300.

It is considered general that printing on the sheet by the printer 300 or the image formation is started after completing the output of the read image from the image reader 200 to the controller 400. However, in the present embodiment, under a particular condition, the read image is output from the controller 400 to the printer 300 to start the image formation in the printer 300 without waiting for the completion of the output of the read image from the image reader 200. In this specification, such control mode is called "read and write parallel control".

There are various conditions which enable the read and write parallel control. One example is a case where the image processing unit(B) 405 can apply the image processing and transfer the image-processed read image to the printer 300 without waiting for the completion of the output of the read image to the controller 400. For example, this includes a case when the image processing unit(B) 405 performs the rotation processing or changes the output size of the read image, that is, when it is determined that the read image of a whole original is not required to be completed. In this case, the image processing unit(B) 405 receives the read image from the image reader 200 and sequentially performs the image processing on the read image. Then, the image processing unit(B) 405 converts the read image to data suitable for the image formation of the printer 300 (called "image forming data"). Then, the image processing unit(B) 405 transfers the image forming data to the printer 300 as needed. This makes it possible to complete the image formation in the printer 300 faster than a case where the read and write parallel control is not performed. As a result, FCOT (First Copy Output Time) is shortened.

As mentioned, increasing the memory output frequency from the image memory(A) 260 is effective to reduce the reduction of the throughput in a case where the delay occurs in the image processing by the controller 400. On the other hand, as the memory output frequency increases, due to a reason described later, memory output start timing needs to be delayed. Thereby, from a point of improving the FCOT, it is not always advantageous. In the read and write parallel control, it is desired to realize the optimum FCOT while lowering the memory output frequency as low as possible to make the memory output start timing early. Regardless of the memory output frequency of the read image from the image memory(A) 260 and the image memory(B) 405, timing to complete the output of the read image to the printer 300 is almost the same. Thereby, by using the low memory output frequency to make the memory output start timing early, quick finish of the output to the printer is realized so that the FCOT is shortened. On the other hand, constant use of the low memory output frequency reduces the throughput of the image reading. So, in the present embodiment, to achieve both shortening the FCOT through the read and write parallel control and suppressing reduction of the throughput of the image reading, when reading the image of the first surface original which gives influence on the FCOT, the read image is to be output from the image memory at the first frequency. Then, after the second surface original and thereafter, the first frequency and the second frequency (>first frequency) can be selected. It means that after completing the output of the read image of the first surface original and before starting the image reading of the second surface original, the memory output frequency when outputting the read image of the second surface original from the image memory is changed.

In general, in a case where the memory output frequency is higher than the memory input frequency, for example, when the memory output is started almost simultaneously with the memory input, during recording the read image in the image memory, the memory output sometimes catches up with this. Thereby, in a case where the memory output frequency is higher than the memory input frequency, if the memory output start timing which completes the memory output almost simultaneously with the completion of the memory input is determined, the FCOT becomes the shortest. Thereby, in the present embodiment, the memory output start timing to the controller 400 is determined using a read size and a ratio of the memory output frequency with respect to the memory input frequency with an image reading start time point as a starting point. In particular, the memory output start timing of the read image to the controller 400 is set after a lapse of a time (Tstart), which is obtained by a following Expression 1, from the image reading start time point.

$$T\text{start}=(\text{read size})*(1-\text{memory input frequency}/\text{memory output frequency})/(\text{original conveyance speed}) \quad \text{(Expression 1)}$$

In this manner, an input completion time point of the read image to the image memory(A) 260 substantially matches an output completion time point of the read image to the controller 400 and also, the FCOT can be shortened. The two time points "substantially match" means that the two points are close to the same time point. To start the memory output at the timing of this time (Tstart), for example, what should be done is to count a drive pulse of the conveying motor 150 used for the control of the conveyance of the original to derive a distance corresponding to the time (Tstart).

Figure 14:
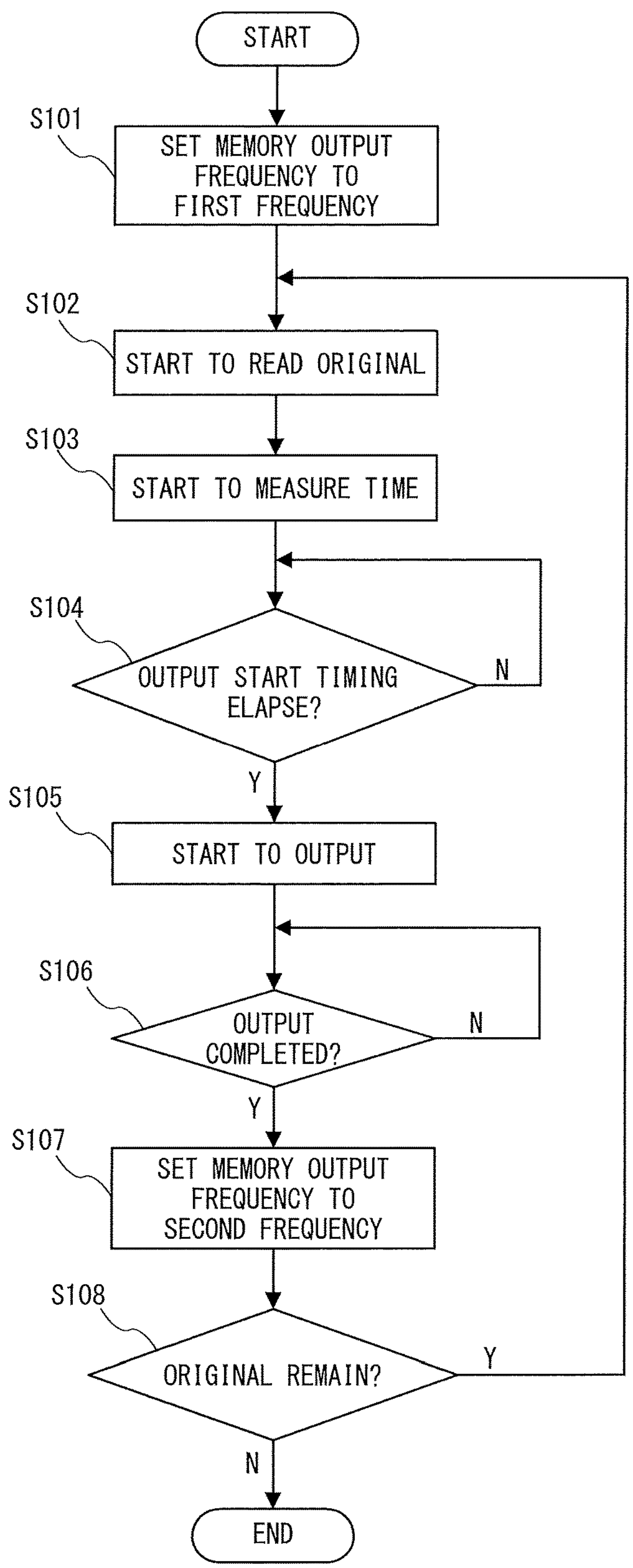
FIG. 14 is an explanatory diagram for an image reading processing procedure in the image reader.

FIG. 14 is an explanatory diagram for a memory output processing procedure performed by the CPU(A) 251 in which the read image stored in the image memory (A) 260 is transferred to the controller 400. The processing is started when a job for performing the image reading operation performed by the ADF 100 and the image reader 200 is started. Referring to FIG. 14, the CPU(A) 251 of the image reader 200 sets the memory output frequency to the first frequency (Step S101). Then, the CPU(A) 251 drives the scanner unit 209 to start to read the original (Step S102). At the same time, the CPU(A) 251 starts to measure a time for determining the memory output start timing (Step S103) and also determines whether the output start timing of the read image for the read size of the original elapses or not (Step S104). If it is determined that the measured time does not elapse the output start timing (Step S104: No), the CPU(A) 251 waits until the time elapses. The output start timing is after a lapse of the above time (Tstart). The CPU(A) 251 detects a current reading position of the original or an input position to the image memory(A) 260 by counting the number of the drive pulses of the conveying motor 150. When the result becomes larger than the distance corresponding to the time (Tstart), the CPU(A) 251 determines that the above time (Tstart) elapses.

If it is determined that the above time (Tstart) elapses (Step S104: Yes), the CPU(A) 251 controls the image transfer unit 255 to cause the controller 400 to start to output the read image (Step S105). It means that the CPU(A) 251 starts to output the read image from the image memory(A) 260 and also determines whether the output of the read image is completed or not (Step S106). If it is determined that the output of the read image is not completed (Step S106: No), the CPU(A) 251 waits until it is completed. Whether the output of the read image is completed or not is determined by counting the number of lines of the read image which is output and whether the output for the number of lines is completed or not.

If it is determined that the output of the image to the printer 300 is completed (Step S106: Yes), the CPU(A) 251 sets the memory output frequency to the second frequency which is higher than the first frequency (Step S107). The CPU(A) 251 then determines whether the original remains on the original tray 30 based on the output of the original presence/absence detecting sensor 16 (Step S108). If it is determined that the original remains (Step S108: Yes), the reading of the original is not completed. Thereby, in this case, the CPU(A) 251 returns to the processing of the Step S102 and repeats the processing up to the Step S107. If it is determined that no original remains (Step S108: No), it means that the reading of all originals is completed so that the CPU(A) ends the processing.

Figure 15:
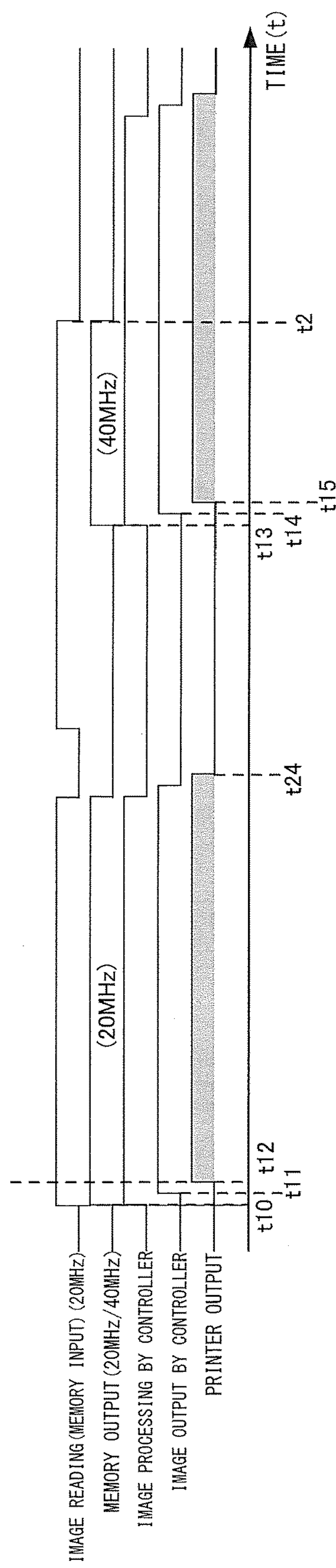
FIG. 15 is a schematic diagram showing an operation timing example for each part at the single-sided image reading.
Figure 16:
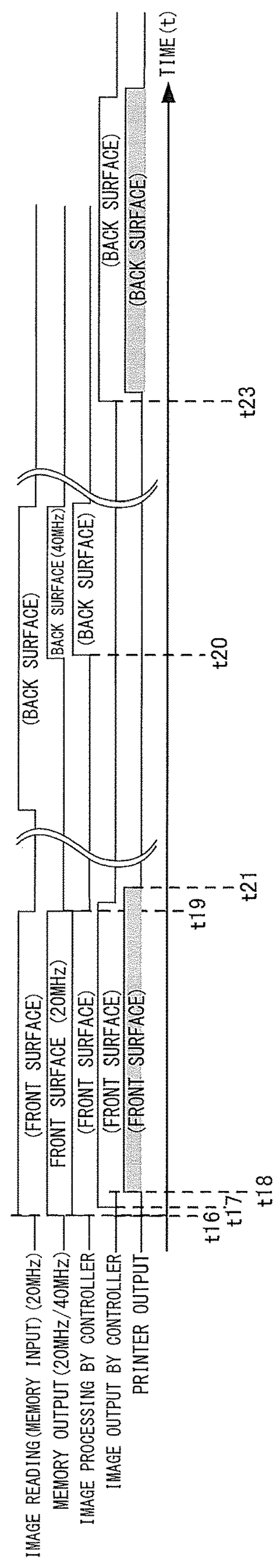
FIG. 16 is a schematic diagram showing the operation timing example for each part at the double-sided image reading.

Here, a description is provided with regard to timing before the printer 300 starts to form the image based on the transferred read image. FIG. 15 shows an example of a case where the image is formed by reading only the one side of the original (single-sided image formation). FIG. 16 shows an example of a case where the image is formed by reading the double sides of the original (double-sided image formation). Referring to FIG. 15, in case of the single-sided image formation, the image reader 200 sets the memory output frequency to 20 MHz at the start of the job. The memory output start timing is defined by the time obtained by the (Expression 1) (Tstart). When the image reading for a data amount corresponding to the time (Tstart) and the memory input of the read image are completed, the CPU(A) 251 starts the output of the read image from the image memory (A) 260. If the original to be read is A4R size (297 mm), for example, as the memory output frequency is 20 MHz, the memory output start timing obtained by the (Expression 1) is a time point t10 or 0 sec (actually, time substantially close to 0 sec elapses). That is, the memory output start is allowed almost simultaneously with the start of the original image reading (memory input), which enables the start of outputting the read image to the controller 400 at the shortest timing. The controller 400 receives the read image from the image reader 200 at the time point t10, processes the image to convert to the image forming data to output to the printer 300 (image processing by the controller). Then, at a time point t11, the start of outputting the image forming data to the printer 300 is enabled. This starts the transfer of the read image to the printer 300 from timing of a time point t12, which enables to start the image formation in the printer 300 immediately. The image formation (printer output) by the read image ends at a time point t24.

When it is detected that, through the control of the CPU(B) 401 of the controller 400, all target read images corresponding to the original size are transferred to the printer 300, the CPU(A) 251 of the image reader 200 switches the memory output frequency to the second frequency of 40 MHz. Thus, a time point t13 when the memory output of the next read image is started becomes timing determined by the (Expression 1) with an image reading start time point of the read image of the second original as a starting point. For example, if the original size is A4R size (sub-scanning length, 297 mm) and the original conveyance speed is 297 mm/s, the memory output start time point is 0.5 sec, which is obtained as follows.

$$297*(1-20/40)/297=0.5 \text{ sec}$$

That is, the memory output is started at the time point t13 when the read image for the data amount corresponding to 148.5 mm from the leading edge of the original is input to the memory. As mentioned, using the time calculated by the (Expression 1) (Tstart) as a parameter, the memory input can be completed almost simultaneously with the memory output at the time point t2. Thereafter, predetermined image processing is applied in the controller 400. At a time point t14, the image output to the printer 300 (image output by the controller) is started. Then, at a time point t15, the image formation is started in the printer 300.

Referring to FIG. 16, in case of the double-sided printing, the read image of the front surface of the original and the read image of the back surface of the original are alternatively input in the image memory(A) 260. The CPU(A) 251 of the image reader 200 sets the memory output frequency to 20 MHz at the start of the job. The memory output start timing is determined by the time from the memory input start timing obtained by the (Expression 1) (Tstart). The CPU(A) 251 starts the memory output when the image reading for the data amount corresponding to the time (Tstart) and the memory input of the read image are completed. For example, if the original size is A4R size (297 mm), for example, as the memory output frequency is 20 MHz, the memory output start time point obtained by the (Expression 1) is t16, or 0 sec (actually, time substantially close to 0 sec elapses). That is, the output (transfer) of the read image to the controller 400 is started almost simultaneously with the start of the original image reading (memory input). The controller 400 receives the read image from the image reader 200, processes the image to convert to the image forming data to output to the printer 300 (image processing by controller). Then, at a time point t17, the controller 400 outputs the image forming data to the printer 300 (image output by the controller). Thereby, the output to the printer is started at a time point t18 and printer 300 starts the image formation immediately. The image formation by the read image (printer output) ends at a time point 21.

Here, the image reader 200 switches the memory output frequency to 40 MHz which is the second frequency. This makes the memory output start timing of the next read image or the read image of the back surface (a time point t20) relatively late with respect to the memory input timing of a target read image (a time point t23). It is noted that in a case where the printer 300 performs the double-sided image formation, as mentioned, after the image formation on the front side is finished, a time when the sheet is being conveyed along the conveying path 112 is relatively long. Thereby, the memory output start timing of the read image of the back surface to the printer 300 from the controller 400 (time point t23) depends on the time when the sheet is being conveyed along the conveying path 112. As to the image formation on the front side of the sheet, in a case where the read and write parallel control is not performed, the image formation is started after a time point t19. On the other hand, by performing the read and write parallel control, the transfer start timing of the read image to the printer 300 is at the time t18 at the shortest. Thereby, the timing to start and finish the image formation on the front and back surfaces of the first sheet becomes faster, which realizes the optimum FCOT.

It is noted that it is possible to prepare for the occurrence of the delay in the image processing by the controller 400 by switching the memory output frequency to 40 MHz after the image reading of the first surface original is finished in the image reader 200. In this case, the memory output start timing of the read image of the second surface original becomes late but influence on the image forming timing of the printer 300 on the back surface of the sheet is reduced.

Figure 17:
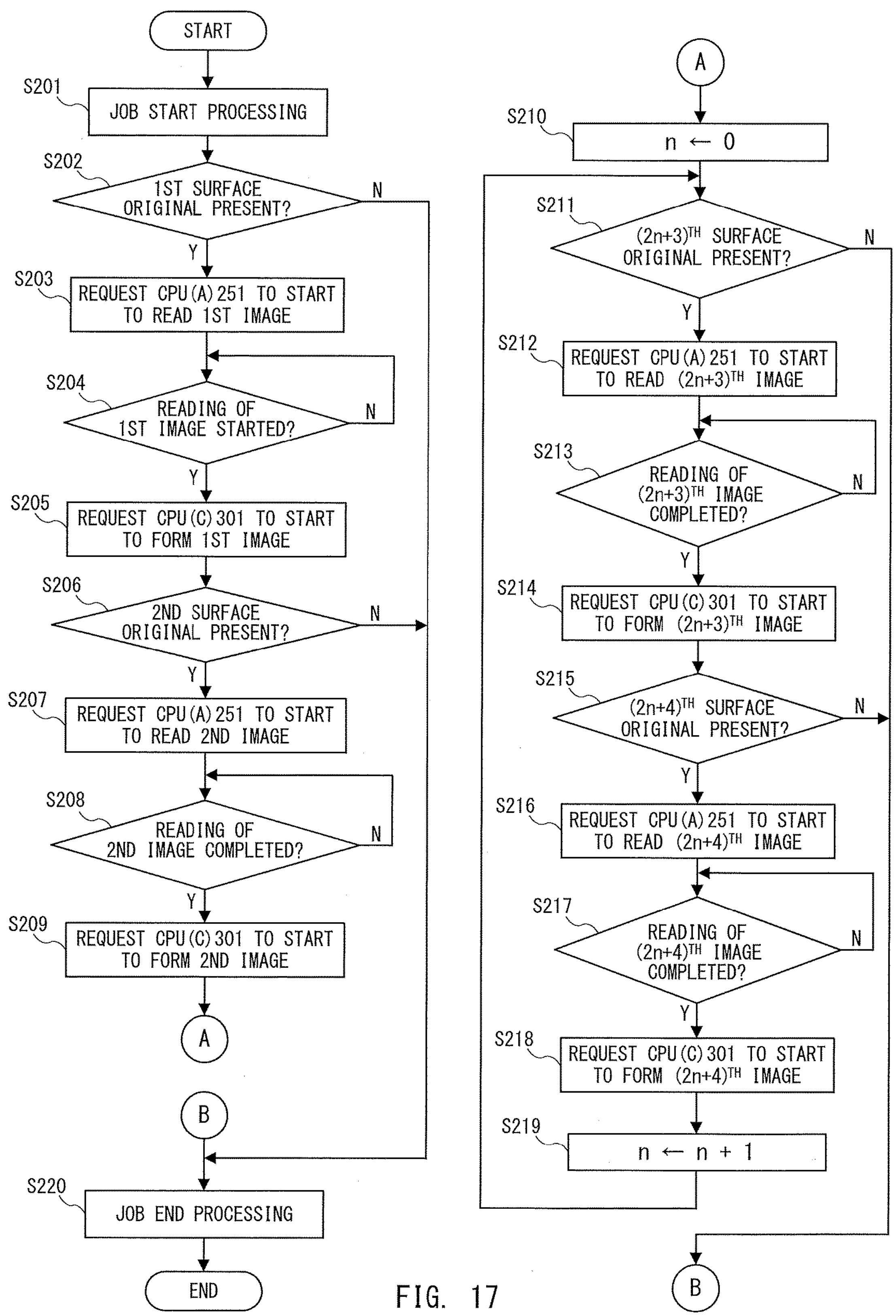
FIG. 17 is an explanatory diagram of a processing procedure when executing a double-sided printing job.

Here, a description is provided with regard to a procedure when the controller 400 communicates with the ADF 100, the image reader 200, and the printer 300 to perform job control in cooperation. The controller 400 performs various job control. Here, a job to be controlled is a job of reading a plurality of the single-sided originals in the ADF 100 and the image reader 200 and performing the double-sided printing in the printer 300. FIG. 17 is an explanatory diagram of a control procedure performed by the CPU(B) 401 of the controller 400 in the job. An outline of the job control is described as follows. The CPU(B) 401 performs job start processing at the start of the job and performs job end processing at the end of the job. During each processing, the CPU(B) 401 performs input/output control of data required for the processing and informs the CPU(A) 251 and the CPU(C) 301 of an operation start request and an operation end request. Also, from the communication result with the CPU(A) 251, the CPU(B) 401 determines the presence/absence of the original on the original tray 30 for every sheet (one surface). The CPU(B) 401 also determines the start of the image reading and the completion of the image reading. Then, the CPU(B) 401 informs the CPU(C) 301 of the image forming start request. One feature of the present embodiment is, in case of the single-sided image reading, to shorten the FCOT by starting to print the read image of the original before the image reading of each original is completed.

Next, referring to FIG. 17, a procedure to execute the job is described in detail. As the job start processing, the CPU(B) 401 initializes the required data and requests the job start processing to the CPU(A) 251 and the CPU(C) 301 (Step S201). Further, from the communication result with the CPU(A) 251, the CPU(B) 401 determines the presence/absence of the first surface original on the original tray 30 (Step S202). If it is determined that the first surface original is absent (Step S202: No) or the original is absent, the CPU(B) 401 performs the job end processing (Step S220). At this time, the CPU(B) 401 discards unnecessary data and informs the CPU(A) 251 and CPU(C) 301 of the operation end request.

If it is determined that the first surface original is present (Step S202: Yes), the CPU(B) 401 informs the CPU(A) 251 of the reading start request of the first image (Step S203). If the CPU(B) 401 waits for the start of the image reading of the first surface original (Step S204: No) and it is started (Step S204: Yes), the CPU(B) 401 informs the CPU(C) 301 of the image forming start request without waiting for the completion of the image reading (Step S205). Then, in parallel with the image reading from the ADF 100 and the image reader 200, the CPU(B) 401 causes the printer 300 to perform the image formation. Continuously, the CPU(B) 401 determines the presence/absence of the second surface original on the original tray 30 from the communication result with the CPU(A) 251 (Step S206). If it is determined that the second surface original is absent (Step S206: No), the CPU(B) 401 performs the job end processing (Step S220). If it is determined that the second surface original is present (Step S206: Yes), the CPU(B) 401 informs the CPU(A) 251 of the reading start request of the second image (Step S207). If the CPU(B) 401 waits for the completion of image reading of the second surface original (Step S208: No) and it is completed (Step S208: Yes), the CPU(B) 401 informs the CPU(C) 301 of the image forming start request (Step S209). Then, after completing the image reading from the ADF 100 and the image reader 200, the CPU(B) 401 causes the printer 300 to perform the image formation.

After a third surface original and thereafter, as long as the original is present on the original tray 30, the similar processing is continued. Here, for generalization, a description is provided using a variable n for convenience. First, 0 is substituted in the variable n (Step S210). Further, from the communication result with the CPU(A) 251, the CPU(B) 401 determines the presence/absence of $(2n+3)^{th}$ original on the original tray 30 (Step S211). If it is determined that the original is absent (Step S211: No), the CPU(B) 401 performs the job end processing (Step S220). If it is determined that the original is present (Step S211: Yes), the CPU(B) 401 informs the CPU(A) 251 of the reading start request of the image of the $(2n+3)^{th}$ original (Step S212). If the CPU(B) 401 waits for the completion of the image reading (Step S213: No) and it is completed (Step S213: Yes), the CPU(B) 401 informs the CPU(C) 301 of the image forming start request (Step S214). Then, after the completion of the image reading from the ADF 100 and the image reader 200 is informed, the CPU(B) 401 causes the printer 300 to perform the image formation.

Continuously, the CPU(B) 401 determines the presence/absence of $(2n+4)^{th}$ original on the original tray 30 from the communication result with the CPU(A) 251 (Step S215). If it is determined that the original is absent (Step S215: No), the CPU(B) 401 performs the job end processing (Step S220). If it is determined that the original is present (Step S215: Yes), the CPU(B) 401 informs the CPU(A) 251 of the reading start request of the image of the $(2n+4)^{th}$ original (Step S216). If the CPU(B) 401 waits for the completion of the image reading (Step S217: No) and it is completed (Step S217: Yes), the CPU(B) 401 informs the image forming start request to the CPU(C) 301 (Step S218). Then, after the image reading from the ADF 100 and the image reader 200 is completed, the CPU(B) 401 causes the printer 300 to perform the image formation. Thereafter, the CPU(B) 401 substitutes a value of n+1 in the variable n (Step S219) and repeats the processing from the Step S211.

By performing the control in accordance with the above procedure, the job of reading the image of a plurality of the single-sided originals in the ADF 100 and the image reader 200 to perform the double-sided printing in the printer 300 is realized. In this control, the shortest FCOT is realized by causing the printer 300 to perform the image formation in parallel with the image reading from the first surface original (first sheet of the single-sided original).

Figure 18:
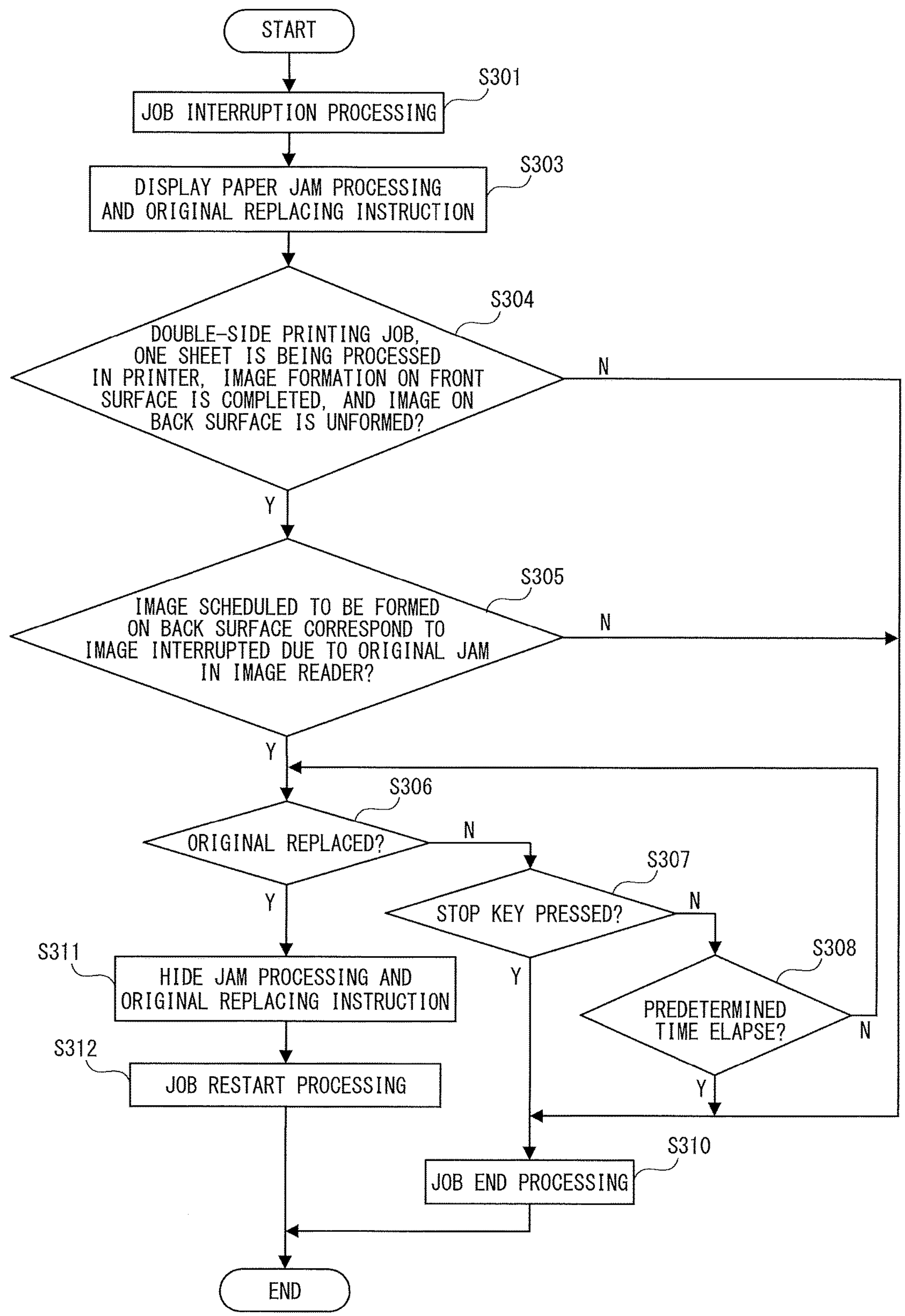
FIG. 18 is an explanatory diagram for an interruption processing procedure of the double-sided printing job.

FIG. 18 is a diagram showing an interruption processing procedure performed by the CPU(B) 400 of the controller 400 in a case where the image reading of the second surface original is failed by the paper jam of the original during the job processing. This processing procedure is executed when, from the communication result with the CPU(A) 251, the paper jam of the second surface original is detected and the CPU(B) 401 recognizes that the image reading is failed during the job processing described in FIG. 17. It is noted that, in the processing procedure, the job processing which is being executed is interrupted, restarted, and finished as needed. It is noted that in case of the jamming in the printer 300, the original reading processing is continued but the printing processing in the printer part 300 is interrupted and an instruction to remove the printing sheet is displayed.

Referring to FIG. 18, the CPU(B) 401 interrupts the job processing which is currently being executed (Step S301).

The CPU(B) 401 displays paper jam processing and original replacing instruction on the display of the console portion 404 (Step S303). Further, in a case where the job which is currently being executed is the double-sided printing job, the number of sheets which is being processed in the printer 300 is one, the image formation on the front surface of the sheet is completed, and the image on the back surface of the sheet is unformed (Step S304: Yes), the CPU(B) 401 proceeds the processing to a Step S305. In the Step S305, the CPU(B) 401 determines whether or not an image scheduled to be formed on the back surface of the sheet in the printer part 300 corresponds to the image of the original of which the reading is interrupted due to the original jam in the image reader 200 (Step S305). If it is determined that the image scheduled corresponds to the image of the original (Step S305: Yes), the CPU(B) 401 waits for a predetermined time (Step S308) until processing to release the original jam is executed and the original is replaced on the original tray 30 (Step S306: Yes) or a stop key is pressed (Step S307). It is noted that whether the image scheduled to be formed on the back surface of the sheet corresponds to the image of the original of which the reading is interrupted can be determined by interposing processing to distinguish the front and back surfaces of the original performed by the CPU(A) 251 or the CPU(B) 401.

In a case where the original is removed and replaced within the predetermined time from the job interruption (Step S306: Yes), the CPU(B) 401 hides the paper jam releasing processing and the original replacing instruction (Step S311) and performs job restart processing (Step S312). If the stop key is pressed in a predetermined time in the console portion 404 (Step S307: Yes), the CPU(B) 401 performs the job end processing (Step S310). In a case where neither the paper jam processing nor the replacing of the original is performed (Step S306: No), the stop key is not pressed (Step S307: No) and the predetermined time elapses (Step S308: Yes), the CPU(B) 401 performs the job end processing (Step S310).

Figure 19A:
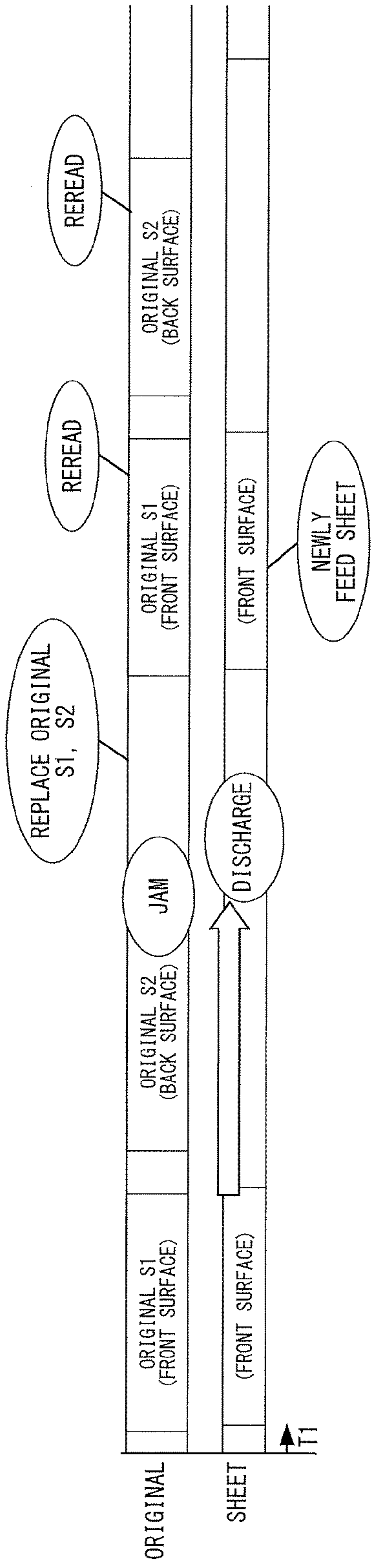
FIG. 19A and FIG. 19B are schematic diagrams showing a timing relation between the image reading and image forming on the sheet.
Figure 19B:
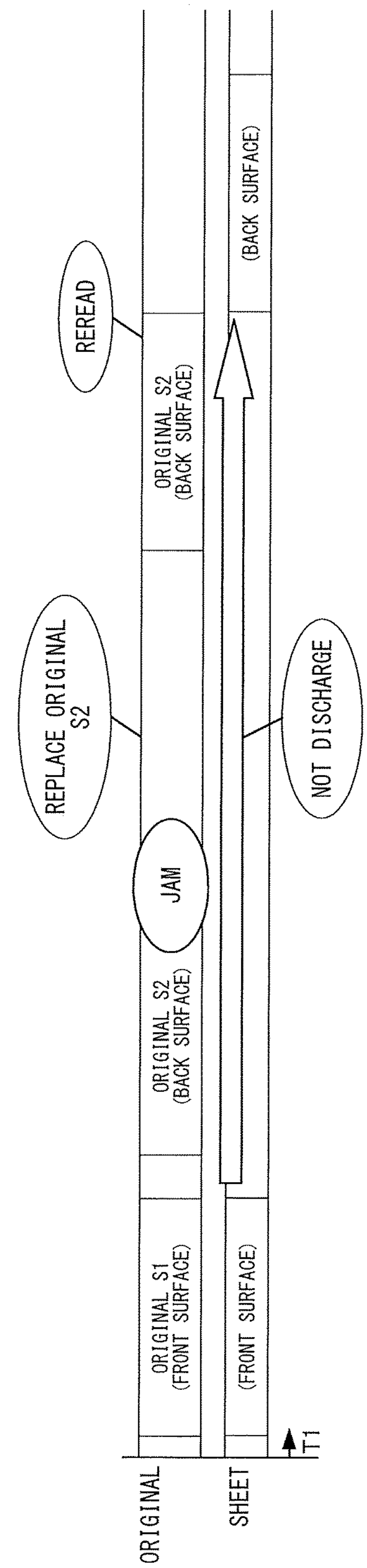

FIG. 19A and FIG. 19B show timing relation between an original reading state and a printing state on the sheet when the job interruption processing in FIG. 18 is performed while the job processing described in FIG. 17 is being executed. FIG. 19A is an example of a case through conventional control. FIG. 19B is an example of a case through the control of the present embodiment. Both FIG. 19A and FIG. 19B assume a case where the image reading of the first surface original S1 is normally completed but the original jam occurs in the ADF 100 during the image reading of the second surface original S2. According to the conventional control (FIG. 19A), after the occurrence of an original jam, a user needs to replace the first surface original S1 and the second surface original S2 on the original tray 30 to perform the image reading again from the first surface original S1. Further, the sheet with the image of the first surface original to be formed on the front surface of the sheet is discharged with no image formed on its back surface and the image of the first surface original is formed again on the front surface of the newly fed sheet.

On the other hand, according to the control of the present embodiment (FIG. 19B), in a case where the jam occurs in the second surface original, the user only has to replace the second surface original on the original tray 30. The sheet on the front surface of which the image formation of the first surface original is completed stops for a predetermined time in the double-side reversing unit 124. Then, after the second surface original is replaced, the stopped sheet is conveyed. Then, the image of the second surface original which is yet to be formed is formed on the back surface of the sheet. During the predetermined time, the motor and the like of the printer 300 are kept in rotation, which is in a state ready to form the image. The predetermined time is set, for example, within one minute during which the user assumes to remove the original when the original jam occurs in the ADF 100. Further, in a case where the original is not removed even the predetermined time elapses, the printing operation is stopped. It is noted that the sheet in the double-side reversing unit 124 is automatically discharged outside the machine. Thus, the control of the present embodiment prevents the sheet on the front surface of which the printing is performed from being wasted and the original is not reread or the sheet is not newly fed, which shortens time required for the image reading and the image formation after releasing the jam.

As mentioned, according to the present embodiment, in case of the single-sided image reading, before the image reading of each original is completed, the read image of the original is started to print. Further, in case of the double-sided image reading, as for the first surface original, before the image reading is completed, the read image of the first surface original is started to print and as for the second surface original, after the image reading is completed, the read image of the second surface original is started to print. Thereby, the FCOT is shortened as compared to the conventional control.

In the control method of the present embodiment and when the printer 300 performs the double-sided printing, the sheet on which printing of the read image of the first surface original is completed is temporarily stopped at a predetermined position of the sheet conveying path in a state ready to form the image up to a time point where the image reading of the second surface original is completed or up to a time point where a predetermined time elapses. Then, after the failure of the image reading of the second surface original, when rereading of the image is normally completed, if it is identified that both the image at the failure of the image reading and the image when the image reading is normally completed are the read images from the second surface original, the control method of the present embodiment releases the temporary stop. Thereby, even if trouble occurs, the image forming processing performed so far and the sheet used so far are not wasted. Moreover, a recovery time at the occurrence of the trouble is shortened as compared to the conventional control.

Further, according to the present embodiment, an image forming apparatus which does not waste the printing sheet even if trouble occurs when reading the image while shortening the FCOT is realized.

Embodiment (s) of the present invention can also be realized by a computer of a system or apparatus that includes one or more circuits (e.g., application specific integrated circuit (ASIC) or SOC (system on a chip)) for performing the functions of one or more of the above-described embodiment(s). The computer may comprise one or more processors (e.g., central processing unit (CPU), micro processing unit (MPU) and may include a network of separate computers or separate processors to readout and execute the computer executable instructions.

While the embodiment of the present invention has been described, the present invention is not limited to the embodiment as described. Further, effect described in the embodiment of the present invention merely lists a most suitable effect derived from the present invention and the effect of the present invention is not limited to that described in the embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s).

This application claims the benefit of Japanese Patent Application No. 2016-230073, filed Nov. 28, 2016 which is hereby incorporated by reference herein in its entirety.

What is claimed is:

1. An image forming apparatus comprising:

an image reader configured to perform image reading of a first original and perform image reading of a second original after reading of the first original;

a printer configured to print a read image read by the image reader on a sheet; and a controller configured to control operation of the image reader and the printer, wherein, as to the first original, the controller is configured, in a case where the printer performs double-sided printing to print on both sides of a sheet, to start to print a read image of the first original before the image reading of the first original is completed, and:

as to the second original, the controller is configured, in a case where the printer performs double-sided printing to print on both sides of a sheet, to start to print a read image of the second original after the image reading of the second original is completed.

2. The image forming apparatus according to claim 1, wherein, in a case where single-sided image reading is performed, each of the first original and the second original is a distinct original sheet, and in a case where double-sided image reading is performed, the first original is a front surface of one original sheet and the second original is a back surface of the one original sheet.

3. The image forming apparatus according to claim 2, further comprising:

a document feeder configured, in a case where single-sided image reading is performed, to convey the first original and the second original to a respective predetermined reading position, and convey, in a case where double-sided image reading is performed, the first original to the reading position, and thereafter convey the second original as a back side of the first original to the reading position.

4. The image forming apparatus according to claim 1, wherein the controller is configured, in a case where the printer performs the double-sided printing, to temporarily stop the sheet on which printing of the read image of the first original is completed at a predetermined position in a state ready to form an image until the image reading of the second original is completed or until a predetermined time elapses after the printing of the read image of the first original is completed.

5. The image forming apparatus according to claim 4, wherein the controller determines whether the image reading of the second original is normally completed, and wherein the controller releases the temporarily stopped sheet in a case where the controller determines that rereading of the second original is normally completed after the image reading of the second original is failed.

6. The image forming apparatus according to claim 1, further comprising a memory, in which the read image of each original which to be read by the image reader is input to the memory at an input frequency set by the controller and the memory outputs the read image of each original to be read which is read by the image reader at an output frequency set by the controller, wherein the controller is further configured, after the output of the read image of the first original from the memory is completed and before the image reading of the second original is started, to change the output frequency when the read image of the second original is output from the memory.

7. The image forming apparatus according to claim 6, wherein the controller is further configured to set the output frequency higher than the input frequency.

8. The image forming apparatus according to claim 7, wherein the controller is further configured to control input start timing of the read image to the memory such that an output completion time point of the read image input to the memory substantially matches an input completion time point of the read image of the original to be read.

9. The image forming apparatus according to claim 8, wherein the controller is further configured to determine input start timing to the memory based on a ratio of the output frequency to the input frequency.

10. The image forming apparatus according to claim 1, wherein a number of read sheets per unit time of the image reader is larger than a number of printing sheets per unit time of the printer.

11. An image forming apparatus comprising:

a document feeder configured to convey an original to a predetermined reading position;

an image reader configured to perform image reading of a first original and perform image reading of a second original after reading of the first original, and configured to store read image in a first image memory;

a controller configured to obtain the read image of each original stored in the first image memory, store the obtained read image in a second image memory, and determine output timing of the read image of each original; and a printer configured to perform double-sided printing to print the read image which is output from the controller using both sides of a sheet, wherein the image reader is configured, before the image reading of each original is completed, to transfer the read image from the first image memory to the second image memory, and wherein, as to the first original, the controller is configured, in a case where the printer performs the double-sided printing, to start to print a read image of the first original before the image reading of the first original is completed, and;

as to the second original, the controller is configured, in a case where the printer performs the double-sided printing, to start to print a read image of the second original after the image reading of the second original is completed.

12. A control method of an image forming apparatus, the image forming apparatus comprising an image reader configured to perform image reading of a first original and perform image reading of a second original after reading of the first original, and a printer configured to print a read image read by the image reader on a sheet, the method comprising:

starting to print a read image of the first original before the image reading of the first original is completed in a case where the printer performs double-sided printing to print on both sides of a sheet; and starting to print a read image of the second original after the image reading of the second original is completed in a case where the printer performs double-sided printing to print on both sides of a sheet.

13. A control method of an image forming apparatus, the image forming apparatus comprising a document feeder configured to convey an original to a predetermined reading position, an image reader configured to perform image reading of a first original and perform image reading of a second original after reading of the first original, a first image memory in which an image read by the image reader is to be stored, a second image memory in which the read image stored in the first image memory is to be stored, and a printer configured to perform double-sided printing to print the read image which is output from the controller using both sides of a sheet, the method comprising:

transferring the read image from the first image memory to the second image memory before the image reading of each original is completed;

starting to print a read image of the first original before the image reading of the first original is completed in a case where the printer performs the double-sided printing; and starting to print a read image of the second original after the image reading of the second original is completed in a case where the printer performs the double-sided printing.

* * * * *